Jan. 31, 1939.  F. W. COFFING  2,145,646
CHAIN HOIST EXTENSION JACK
Filed Oct. 8, 1937  4 Sheets-Sheet 3
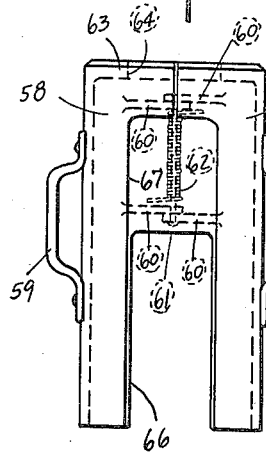
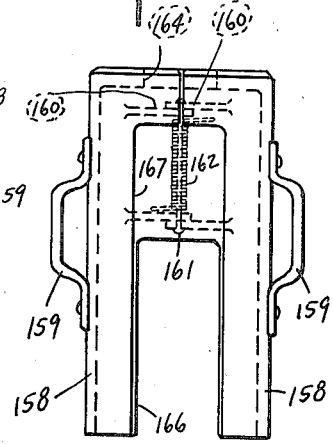
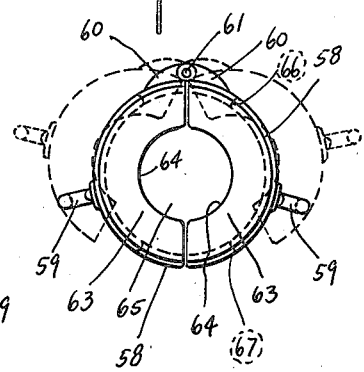
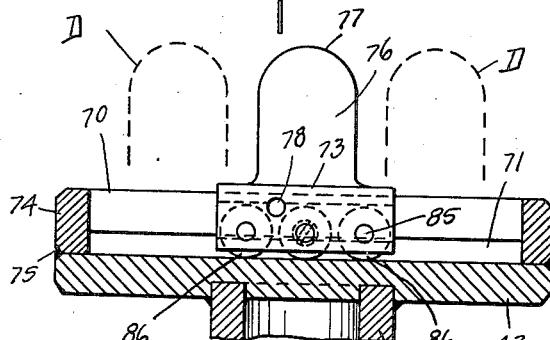
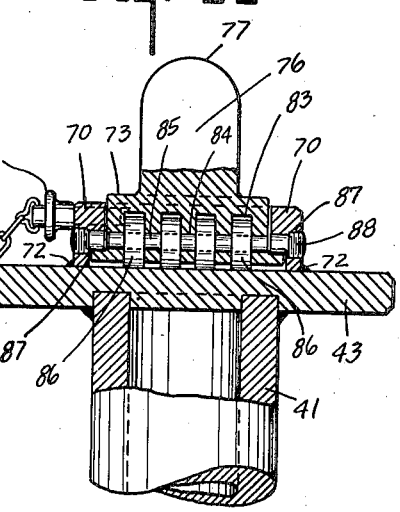
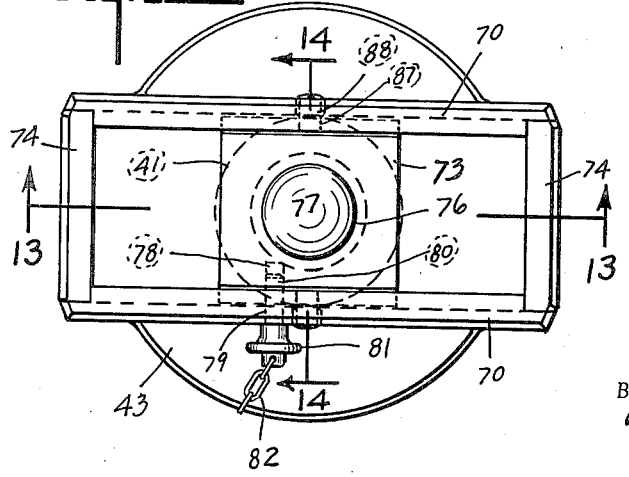
INVENTOR.
FREDRICK W. COFFING.
BY Lockwood, Goldsmith & Galt
ATTORNEYS.

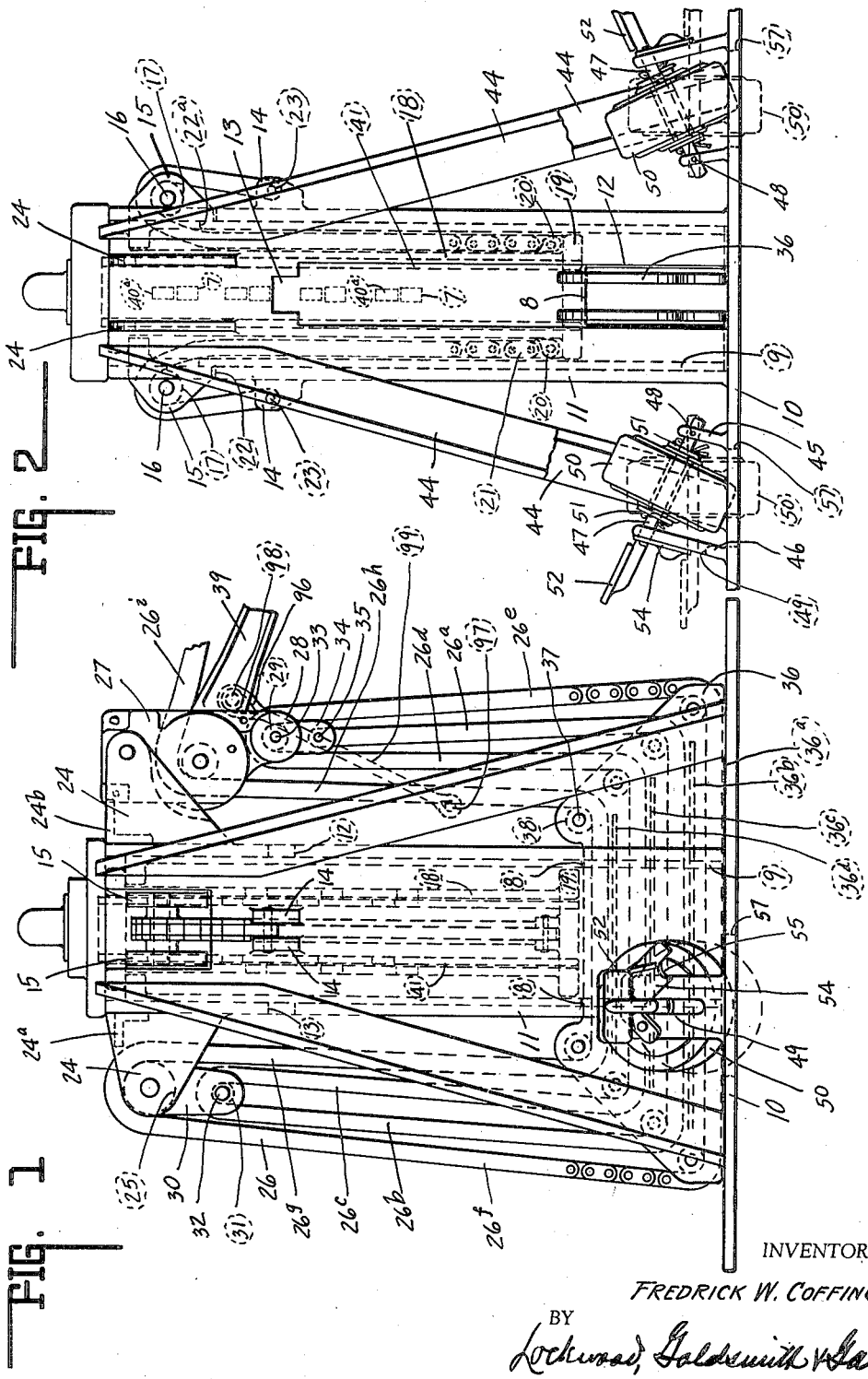

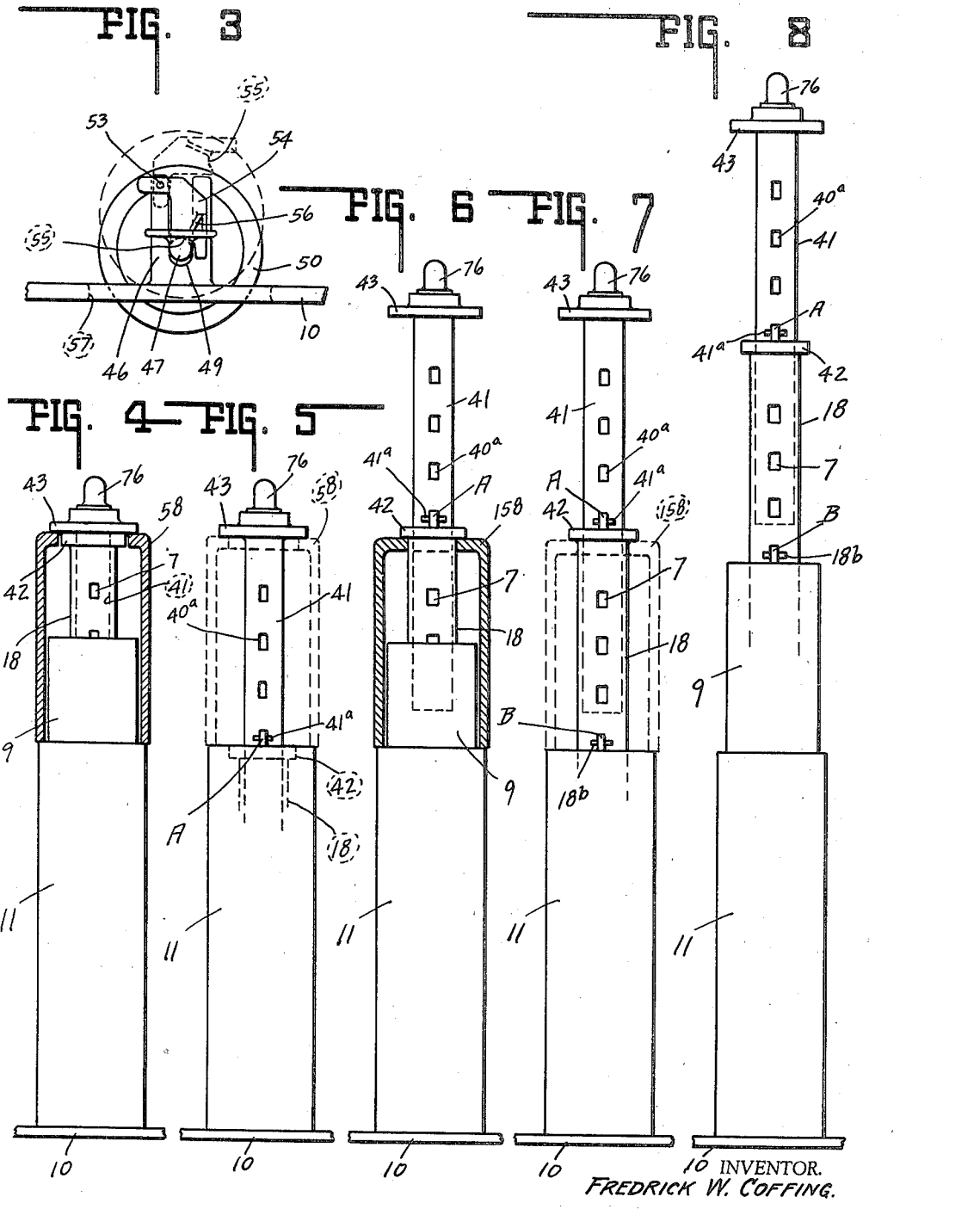

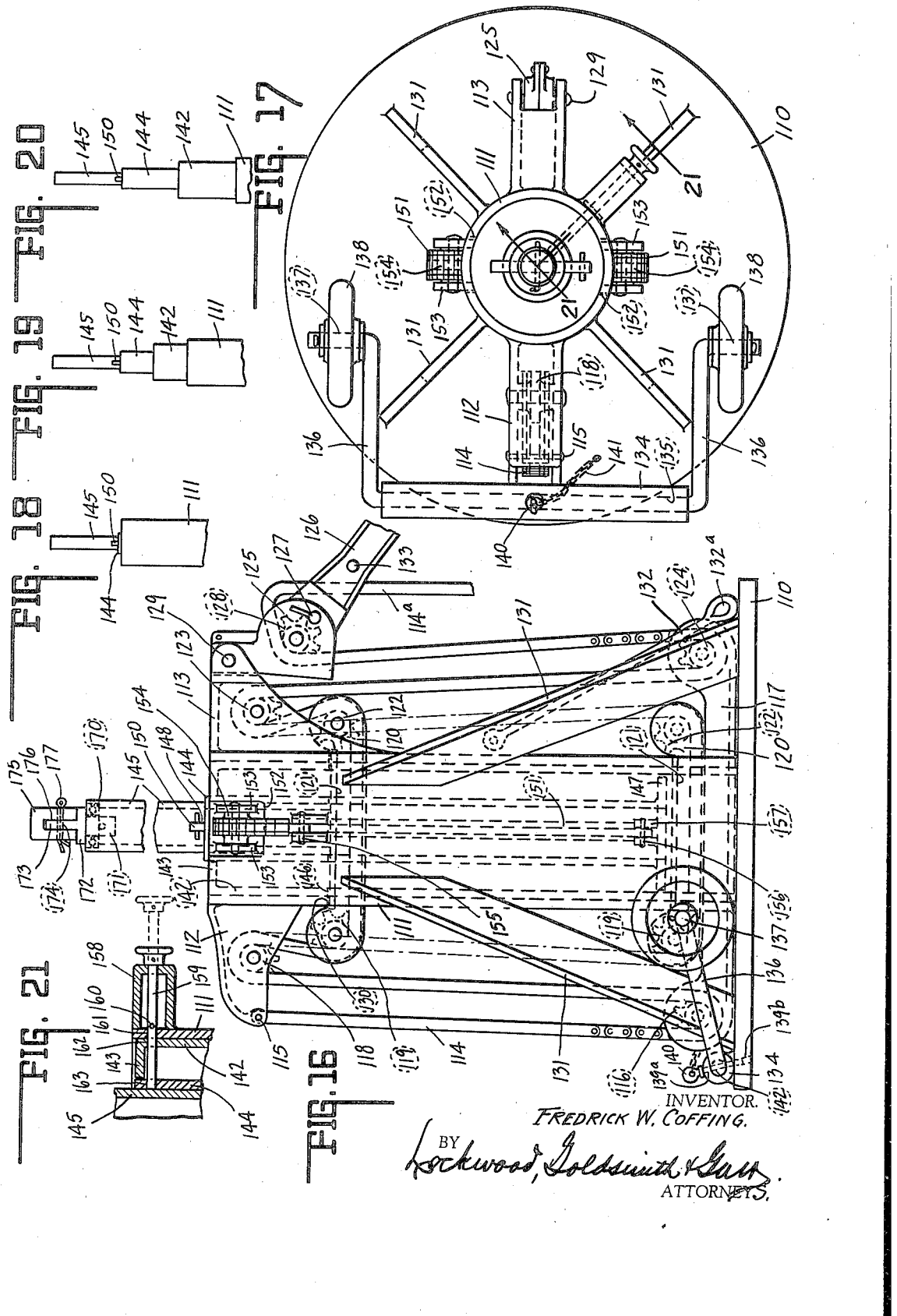

Patented Jan. 31, 1939

2,145,646

UNITED STATES PATENT OFFICE 2,145,646

CHAIN HOIST EXTENSION JACK

Fredrick W. Coffing, Danville, Ill.

Application October 8, 1937, Serial No. 167,960

13 Claims. (Cl. 254—148)

This invention relates to a hoist mechanism peculiarly adaptable for use for operation with aeroplanes for supporting the same in a lowered relation with the landing gear retracted. The purpose of this type of support is to permit the engine mechanics to work upon and inspect the engines without working from a scaffold, which would be required were the plane supported with the landing gear projected.

Other uses peculiarly applicable to aeroplanes are the support of one side or both sides of the lowest wing of an aeroplane for undercarriage tire repair, inspection and operation of the undercarriage associated mechanism and/or shock absorber repair, and/or other purposes. The same general mechanism may also be utilized for aeroplane tail support purposes.

The chief object of the invention is to provide a hoist structure which has relatively low initial positioning clearance and may have the desired extensible height, coupled with sufficient load capacity, this being imperative when it is considered that present day aeroplanes weigh from 1,500 to 50,000 lbs. or more and have a value from $1,500.00 to $150,000.00 or more, respectively. It is obvious, therefore, that for the heavier and higher priced aeroplanes, safety, security, sufficiency of power and ease of operation are absolutely essential in a hoist to be used therewith.

Furthermore, inasmuch as these devices are associated with portable devices, a hoist of this character should be readily portable.

The chief feature of this invention consists in the utilization of a plurality of telescopically associated members and associating therewith one or more split and hinged holding sleeves.

This invention is an improvement upon the basic invention disclosed and claimed in the Coffing Patent No. 1,932,768, dated October 31, 1933.

A further feature of one form of the invention consists in a semi-floating head or load bearing structure which is capable of transverse movement relative to the hoist axis, thereby providing lateral accommodation within the range of head lateral movement for automatic adjustment or centering between the hoist and the aeroplane as the latter is elevated.

The full nature of the invention will be understood from the accompanying drawings and the following description and claims:—

In the drawings,

Fig. 1 is a side elevational view of a hoist structure in collapsed position, embodying the invention, the chains associated therewith being shown in full lines similar to cables, merely for clearness, and the dotted circle in the lower portion indicating the transporting position of the wheel mechanism associated with the hoist proper.

Fig. 2 is a similar view of the hoist, certain of the chain structure being omitted, other of the chain structure being similarly shown in full outline, and parts being broken away to show other parts in detail, the wheel mechanisms being shown in non-supporting position by the full lines, the dotted lines thereof indicating the wheel supporting and transporting position of the latter.

Fig. 3 is a slightly enlarged side elevational view of the wheel mechanism shown by the full lines in the transporting or wheel supporting position, the dotted lines indicating the non-supporting position.

Fig. 4 is a diagrammatic elevational view of the first stage of high speed elevation for initial extension, parts shown in section illustrating the split hinge holding sleeve.

Fig. 5 is a similar view illustrating the position of the parts preliminary to the second stage of low and high speed elevation for secondary extension, the intermediate mechanism shown partially extended in Fig. 4 being fully retracted in Fig. 5.

Fig. 6 is a view similar to Figs. 4 and 5 but illustrates the third stage of high speed elevation, the sectioned parts illustrating a second split hinge holding sleeve.

Fig. 7 is a view similar to Fig. 6, the dotted lines indicating that the split hinge holding sleeve has been removed and the intermediate mechanism has again been retracted and represents either low or high speed operation, preliminary to final elevation.

Fig. 8 is a view similar to Figs. 4 to 7, inclusive, and illustrates most of the parts in the fully extended position for either low or high speed operation.

Fig. 9 is a side elevation of the split hinge locking sleeve shown in section in Fig. 4.

Fig. 10 is a view similar to Fig. 9 and of the split hinge holding sleeve shown in central section in Fig. 6.

Fig. 11 is a top plan view of the split hinge holding sleeve, shown in Fig. 9, the dotted lines indicating the opened position thereof, the full lines illustrating the sleeve in closed position.

Fig. 12 is a top plan view of the head structure of the hoist showing the crosshead and ways thereof as well as a locking arrangeemnt for securing the load contacting member in coaxial position.

Fig. 13 is a central sectional view taken on line 13—13 of Fig. 12 and in the direction of the arrows, the dotted lines indicating the extreme departures in both directions with respect to the load supporting member from its coaxial position.

Fig. 14 is a transverse sectional view taken on line 14—14 of Fig. 12 and in the direction of the arrows and is at right angles to that shown in Fig. 13.

Fig. 15 is a front view illustrating one application of the hoist to an aeroplane.

Fig. 16 is a side elevational view of the aeroplane tail support form of the invention, parts being broken away to illustrate the same and other parts in greater detail.

Fig. 17 is a top plan view of the hoist shown in Fig. 16, the dotted lines illustrating the supporting wheel in transporting position.

Fig. 18 is a diagrammatic elevational view of the hoist in first stage operation.

Fig. 19 is a similar view of the same in second stage operation.

Fig. 20 is a similar view of the same fully extended.

Fig. 21 is an enlarged sectional view of the first stage holding mechanism.

In the drawings—see Figs. 1 and 2—10 indicates a supporting base, 11 a tubular standard rigid therewith and having an open upper end and near its lower end having a pair of diametrically positioned, elongated slots. Said slots at their upper ends are reduced as at 13. Diametrically positioned and suitably secured to the upper end of the tubular member 11 is a pair of slotted brackets 14 which are used in one embodiment of the invention and to which reference will be had hereinafter.

Immediately above the slotted bracket is a pair of spaced ears 15—see Figs. 1 and 2—which mount an axle 16 supporting a roller 17. Within the tubular standard 11 is a tubular member 9 within which is a tubular member 18 having a base portion 19 rigid therewith and provided with ears 20 to each of which is connected one end of a chain 21 which passes upwardly between the tubular member 9 and the tube 18 and extends through the slots or openings 22a and 22 in the tubular member 9 and standard 11, respectively, the same being in registration with the space between the two ears 15. The chain 21 passes over the wheel or sprocket 17 and is anchored to the bracket 14 as at 23.

The intermediate tube 9 is notched out at its lower end as indicated at 8 in Figs. 1 and 2. Tube 9 supports at its upper end in registration with the notches 22a and 22 in the upper end thereof and the tubular member 11, respectively, the said spaced sprocket supporting ears 15. When the member 9 is caused to be elevated with chains 21 attached, it will be apparent that for a given distance the tube 18 will be elevated twice that amount, since the end of the chain 21 is anchored to the tubular member 11 at 23, and the rate of elevation is twice as fast.

Equidistant between the pairs of vertically aligned elements 14 and 15—see Fig. 2—are spaced pairs of ears or brackets 24—see Fig. 1—one pair pivotally supporting a wheel 25 with which is associated a chain 26 and the opposite pair of ears 24 supporting a hoist structure 27. The hoist structure 27 includes depending portions 28 which support pivot 33 mounting a wheel 29. The first mentioned bracket structure 24 dependingly supports the members 30 which support pivot 32 mounting a wheel 31.

Wherever desired or required—see Fig. 1—between the two left hand portions 24, there may be secured a reenforcing and spacing angle member 24a. Similarly the two right portions 24 may be reenforced by the reenforcing angle member 24b.

Rigid with the depending portions 28 are extensions 34 which at 35 anchor one end of the chain or cable 26 to the hoist frame work—see Fig. 1. Mounted in the registering slots 8 and 12 is a pair of plates 36 which project outwardly beyond the tubular member 11 at each side. Said plates 36 are suitably secured together in spaced relation and the projecting portions mount in progressive outward offset and depending relation the several pivots 37 which support wheels 38 in corresponding offset relation.

The initial run 26a of the chain or cable adjacent anchorage 35 passes downwardly and under the second lowest right hand wheel 38—see Fig. 1—thence between the two plates 36 and under and upwardly outside of the second lowest wheel 38 in the left hand portion of Fig. 1, thence upwardly as run 26b. The chain 26 then passes inwardly and over wheel 31 and extends downwardly therefrom as run 26c which passes under the second uppermost left hand positioned wheel 38, thence between the two plates 36 and thence under and upwardly with respect to the second uppermost wheel 38 at the right of Fig. 2. The upward portion identified as run 26d passes outwardly and over the wheel 29 and then passes downwardly as run 26e, which in turn passes downwardly and inwardly below and upwardly over the left hand wheel 38. The outermost upward extension of the cable is indicated as the run 26f. It passes inwardly over the uppermost wheel 25 and then downwardly as run 26g which passes inwardly below the uppermost left hand wheel 38, thence between the two plates 36 and thence outwardly and upwardly relative to the uppermost right hand wheel 38. The innermost right hand extension thereof (as run 26h) passes into the actuating mechanism proper of the hoist and emerges therefrom as at 26i, this being the free end of the chain 26.

The term "wheel" as herein employed, is synonymous with the word "sprocket", since the several elements mentioned as "wheels" are preferably of the sprocket type when the chain 26 is of open link type. When a transverse link chain is utilized these wheels are of the transverse socket groove type. When a cable is utilized these wheels are conventional cable or pulley wheels.

The chain or cable actuating mechanism may be of any conventional character. However, it preferably is of the lever type, the lever portion being indicated by the numeral 39, and the interior mechanism associated therewith, which in turn is associated with the chain 26, may be of the type illustrated and described in the Coffing Patent No. 1,932,768, before mentioned, or that illustrated in other Coffing patents or any other equivalent and/or suitable cable or chain moving mechanism.

Actuation of the lever handle 39 secures chain movement, which in turn secures movement of the elevator mechanism, including the two plates 36—see Figs. 1 and 2. Since these plates engage member 19 on tube 18 and the upper end of slot 8 in tube 9—see Figs. 1 and 2—these members 9 and 19 are similarly elevated.

The purpose of the portions 13 of the slots 12 is, when the elevator has advanced the full length of its possible movement in the slots 12, there is provided clearance for chain nesting. This clearance is especially important on the initial lowering movement of the device to insure release of the chain and prevents chain binding.

In order to insure non-interference between the substantially horizontal lower runs of the chain 26, there is provided between the two plates 36 forming the sides of the elevator the guard members 36a, 36b, 36c and 36d. The lower plate 36a insures that, when the elevator is lowered for engagement with the base plate 10, the lower run of the chain, due to slack, will not project sidewards and prevent lowering to the desired lowest limit, to-wit, plate engagement.

When the chains 21 are not utilized, tubes 9 and 18 are simultaneously advanced. When chains 21 are utilized, as both tubes start to elevate, tube 18 due to movement upwardly of tube 9 which causes the wheels 17 to elevate, advances upwardly twice as fast because chains 21 pull the tube 18 upwardly, so that to elevate tube 18 to the same elevation using chains 21, only requires elevation of the elevator but half of the distance required to elevate said tube 18 the same distance when the chains 21 are not employed. This distinction will be referred to more fully hereinafter.

Within the inner tube 18 see Figs. 1, 2, 6, 7 and 8, is mounted a plunger 41 in the form of a tube. The tube 18 has secured to its upper end a collar 42, see Figs. 4 to 8, while the plunger 41 has secured to its upper end the base plate 43 to which reference will be had hereinafter. The several tubes and the plunger are shown diagrammatically in Figs. 4 to 8, inclusive.

Reference will now be had to Figs. 1 to 3, inclusive, and in the first two figures there is illustrated the inclined braces 44 suitably secured at their bottom ends to the base 10 and suitably secured at their upper ends to the tubular standard 11.

A pair of wheel structures is provided which permits the hoist structure to be readily conveyed to the location where it is to be used in association with an aeroplane and which wheel structures when positioned in inoperative or non-supporting position, permits the device to be used as a hoist. Two complementary wheel structures are illustrated and these are positioned eccentrically of the center of the hoist or to one side of the tubular standard and on opposite sides thereof. Since each wheel structure is identical to the other for opposed positioning, a description of one will suffice for both.

Each wheel structure includes an upwardly and inwardly directed support member 45. Parallel thereto and more remote from the tubular standard 11 is another support member 46. These are rigid with the base 10. An axle 47 is suitably secured in these two parallel supports and the lower and inner end is pivoted as at 48 to the support 45. The other end rides in an elongated slot 49 in the support 46.

Freely rotatable on the axle 47 is a wheel 50, the same being secured against axial movement by any suitable means, such as indicated at 51. The axle is extended and includes a tread plate 52.

Pivotally supported at 53, see Figs. 1, 2 and 3, on support member 46 is a locking pawl 54 which has an arcuately notched end 55, the curvature of which is substantially greater than 90°. This locking pawl also includes an offset portion 56.

When it is desired to lock the wheel in the lowered position, foot pressure is applied to the treadle 52, see Figs. 2 and 3, and the latter projects the wheel 50 downwardly until it projects through the slot 57 in the base 10. When so projected, the axle 47 is lowered in the slot 49 in the member 46 and in an amount sufficient to engage the bottom of the slot 49, see Figs. 1, 2 and 3. The locking dog or latch 54 is then tilted on its pivot so that the arcuate portion 55 is positioned immediately above the axle 47. Release of pressure on the treadle 52 permits the axle 47 to elevate in the slot 49 until it seats in the arcuate notch 55 of the locking pawl. Thus, the parts are locked in the wheel exposing position. When both wheels have been so positioned, the device may be readily moved from place to place.

Reference will now be had to Fig. 1, wherein there is illustrated member 99 which is shown detachably secured as at 98 to the handle 39 and as at 97 to the brace member 44.

Member 99, see Fig. 1, has an elongated loop 96 at its end which may be readily associated with the headed anchor member 98 when the handle 39 is slightly depressed from the position shown in Fig. 1. After such association and after projection of wheels 50 into base exposed relation, an upward and axial pull on the handle first locks the handle to the structure in relatively rigid relation so it thereafter may serve as a drawbar. Continued pulling thereon then will move the device bodily on the supporting wheels.

When it is desired to use the jack or hoist for hoisting purposes, the treadle 52 is depressed until the axle 47 engages the lower end of the slot 49. This is accomplished by foot pressure. The toe of the foot on the treadle may then engage the offset portion 56 on the locking pawl or member 54 and if such movement be to the right—see Fig. 3—the toe will tilt the locking pawl so that upon subsequent release of the treadle pressure, the axle is elevated in the slot 49. In this elevational movement, pawl 54 will tilt upwardly in the counter-clockwise direction into the dotted line position shown in Fig. 3. When in this position, the wheel assumes the dotted line or nested position shown. The locking pawl 54 is normally constrained by gravity toward locking position.

Reference will now be had more especially to Figs. 9, 10 and 11 wherein there is illustrated a tube holding sleeve including two hingedly connected semi-cylindrical portions 58, each of which has secured to it a handle member 59. Each portion 58 is provided with a spaced pair of lugs 60. These—see Fig. 9—are offset relative to the adjacent lugs 60 of the other member 58. The pivot pin 61 connects these lugs together and thus hingedly connects the two holding sleeve portions together and serve as a support for a coil spring 62, the opposite ends of which bear on opposed members 58, thus normally constraining the members 58 toward the closed position or tube encircling position, as hereinafter set forth. Each of the members 58 includes an inwardly directed flange portion 63 arcuately recessed as at 64 to form a circular opening 65, as shown by the full lines in Fig. 11. The two hinged portions can be manually moved outwardly into opened relation as shown by the dotted lines in said Fig. 11.

The holding sleeve illustrated in Fig. 10 is substantially identical to that illustrated in Figs. 9 and 11 and bear similar numerals of the one hundred series. The only difference is that the diameter of the hole formed by the arcuate wall portions 164 is smaller than the diameter of the hole formed by the arcuate wall portions 64. Each of the holding sleeves is provided with diametrical recesses, one of which is longer than the other. These are formed by providing a complementary notch in adjacent edges of the portions 58 of the holding sleeve. The slots are in alignment which is coplanar with the hinge axis. The slot 66 which is in longitudinal alignment with the hinge axis is the shortest. The longer slot 67 may be slightly wider than the shorter slot 66, as shown in Fig. 9. Both slots, however, may be of equal width.

The operation of the device thus far disclosed will now be set forth. When the hoist is positioned beneath the object to be elevated, reciprocation of handle 39, when the chain moving mechanism is conditioned for elevation, causes chain 26 to elevate the elevating mechanism, including the two plates 36. If the chains 21 be not employed, then the first elevation causes tubes 9, 18 and 41 to elevate until the top edge of the plates 36 engages the upper edges of slots 12 adjacent the recessed portion 13. There is then applied to the device while thus elevated, the holding sleeve shown in Figs. 9 and 11 so that the portion 63 thereof bears against the underface of the portion 43 of the tubular plunger 41, see Fig. 4, and the collar or head portion 42 of the tube 18 is nested in the arcuate opening 65 shown in Fig. 11. The lower end of the holding sleeve 58 bears on the projecting portions 24, see Figs. 1 and 2, or on the upper end of the tubular standard 11, see Fig. 4. The chain moving mechanism is then conditioned for lowering and it may be lowered through handle operation or may be released to free chain action, depending upon the chain moving mechanism employed. Howsoever the chain is released, the same permits the tubes 18 and 9 to be repositioned, as shown in Figs. 1 and 2.

When thus positioned, there is applied to the tubular plunger 41 a transverse locking member and/or key A see Fig. 5, which extends through registering apertures 40a formed in the tubular plunger 41. As shown herein a longitudinal series of aligned apertures is provided. The slotted portions as shown in Fig. 9 permit the member A to be passed through the tubular plunger 41 while the sleeve still holds the plunger elevated with respect to the other tubes. Any suitable locking means for retaining the member A in the selected pair of openings 40a may be utilized, if desired, as at 41a.

The chain moving mechanism is then conditioned for elevational movement and operation of the handle immediately elevates tubes 18 and 9 which in turn correspondingly elevates plunger 41 so that the holding sleeve may be removed, see Fig. 6.

The elevational movement is continued following removal of the holding sleeve 58 until the tubes 18 and 9 are again elevated the full extent of the movement permitted by the slot 12. When thus positioned the holding sleeve 158 shown in Fig. 10 is applied to the collar portion 42, see Fig. 6. Then the chain moving mechanism is conditioned for lowering and such movement may be of the free chain type or of the step by step type, depending upon the chain moving mechanism employed. In this movement, the tube 9 is returned to the position shown in Figs. 1 and 2 and the tube 18 is held elevated by the holding sleeve 158 shown in Fig. 10 by collar 42, see Fig. 6.

When tube 9 is fully retracted, then through the lowermost registering pair of openings 7 in tube 18, there is positioned a key member B, see Fig. 7, which may be retained therein by any suitable anchoring arrangement desired or required as at 18b, and this key B bears on the upper end of tube 9. There is provided a plurality of longitudinally spaced, aligned pairs of openings 7.

The chain moving mechanism is again conditioned for elevational movement and operation of the handle 39 causes elevation of tube 9 and with it plunger 41 and tube 18, the same being maintained in their previously extended positions. Following initial elevational movement in this portion of the operation, the holding sleeve shown in Fig. 10 is removed and continued operation of the handle will elevate the extensible portion of the hoist mechanism to the final position desired within the limits of the travel permitted by the length of the slot 12.

The foregoing is a description of the slow speed or heavy load type of operation of the mechanism disclosed.

If it be assumed that the overall height of the tubular standard 11 is of a predetermined length, then with this arrangement it is possible to elevate the portion 43 approximately one and a half times the overall height of the tubular standard, thereby providing maximum elevation with minimum initial clearance, and it will be noted that when so extended the tubular plunger has not quite half of its total length nested within the tube 18 and the latter has not quite half of its length nested within the tube 9, and the latter has not quite half of its length nested within the tubular standard 11; therefore, a relatively rigid arrangement of an extensible elevating device is provided.

Reference has been had previously to chains 21, see Fig. 2, and high speed operation, as it has been termed. When chains 21 are employed, it will be recalled that every time the elevator is raised, tube 18 advances twice as fast as tube 9 so that with high speed operation, in order to extend plunger 41 relative to tube 18, it is only necessary to operate the handle 39 one half the amount previously required to elevate tube 18 in order to apply the holding sleeve 58 shown in Figs. 4 and 9 to the tubular plunger 41. When thus applied and tubes 9 and 18 are returned to initial or nested position, the key A is applied to tube 41 and locks the tube 41 to the tube 18 in the extended position, see Fig. 5. In the initial second elevating movement of the elevating mechanism, this holding sleeve is removed and then the tube 9 is elevated only half of its possible full elevation, see Fig. 6, which positions the tube 18 its full extended position. The holding sleeve shown in Fig. 10 is then applied thereto and then the key B is mounted in the lowermost registering pair of openings 7, see Figs. 2 and 7, and thus the tube 18 is secured in fully extended relation with reference to the tube 9.

The mechanism is then conditioned for elevational movement and operation of handle 39 causes the tube 9 to elevate, carrying with it in extended relation plunger 41 and tube 18. In the initial portion in this elevational movement, the load on the holding sleeve is removed and the holding sleeve 158, see Fig. 7, may then be readily removed from encircling relation relative to tube 18. Continued elevational movement of the elevator secures elevational movement of tube 9, tube 18 and tube 41 simultaneously until the load is at the predetermined elevation desired, see Fig. 8. In the final stage of high speed operation, holding sleeve 158 is not required and key B is also not required. When full extension is desired, in high speed operation, only sleeve 58 is required. If full extension is desired, neither sleeve is required for high speed operation.

It will be noted in the first two stages of the high speed elevational movement, the chains are operative and these chains constitute the load supporting mechanism and, therefore, the load that can be elevated in high speed operation is that which is within the safe limits of the capacity of chains 21. This capacity is, however, normally greater than that which can be lifted by handle 39. Therefore, high speed operation is employed with relatively lighter loads and low speed operation is employed with relatively heavier loads.

Whenever the first two stages of elevation are of high speed character and the third stage is of low speed character, which might be desired for certain conditions, then a third and intermediate type of operation is obtained and in this last stage thereof the surplus of chains 21 lies outside of tube 11 and pulleys 17 takes up the slack in the chains 21, if tube 9 is fully extended.

In Figs. 4 to 8 of the drawings, Fig. 4 represents the first stage of elevation in high speed operation with the holding sleeve 58 shown in Figs. 9 and 11 applied thereto and having the larger opening.

Fig. 5 represents the same position of the same parts with the tube 9 and 18 fully retracted, the key A locking the tube 41 in elevated relation relative to the tube 18. The holding sleeve is shown dotted because in this position it is no longer necessary to hold the tubular plunger elevated relative to the succeeding tubes.

Fig. 6 shows the tube 9 elevated half the distance necessary to fully elevate tube 18 and the holding sleeve 158 shown in Fig. 10 is illustrated in Fig. 6 in section. Upon lowering of tube 9 the key B is applied to the lowermost pair of openings 7 for locking the tube 18 in extended relation relative to the tube 9. This is shown in Fig. 7 which also has applied thereto in dotted lines the holding sleeve 158, the same no longer being necessary for holding tube 18 in extended relation relative to tube 9. Continued elevation of tube 9 following removal of the holding sleeve positions the parts in any intermediate position desired, Fig. 8 illustrating a substantially fully extended position thereof.

It is not believed necessary to illustrate the successive positions for all slow and high speed operations but reference will be had briefly to Figs. 4 to 8, inclusive, which coupled with the foregoing explanation, it is believed will be sufficient for an understanding of low speed operation.

Instead of sleeve 9 being shown in Fig. 4 as elevated but half the necessary elevation is shown, the first elevational movement in slow speed operation fully elevates tube 9 and tube 18 and when so elevated, the holding sleeve 58 shown in Fig. 9 is applied in exactly the same manner as illustrated in Fig. 4. Then key A, see Fig. 5, is applied after tubes 9 and 18 have been fully retracted. Then the second stage of elevation is initiated and this is illustrated in Fig. 5, the initial elevation permitting removal of the holding sleeve 58 and it accordingly is represented in dotted lines in Fig. 5. The elevational movement is continued until sleeve 18 is positioned as shown in Fig. 6, and tube 9 instead of being elevated half its necessary elevation, as shown in said figure, is fully elevated therewith. Then the holding sleeve 158, shown in Fig. 10, is applied in the manner shown in Fig. 6. The tube 9 is then retracted and when fully retracted, the locking key B, see Fig. 7, is applied to the tube 18 to fix the same in extended relation relative to tube 9, and upon initiation of the third elevational movement represented by Fig. 7, the holding sleeve 158 shown dotted in said figure is removed and tube 9 is elevated to the height desired within the range of the limits of possible elevation provided by slots 12 and this position is shown in Fig. 8.

Reference will now be had to Fig. 15 wherein the hoist is shown positioned to one side of the fuselage of an aeroplane and bearing on the wing. If it were desired to elevate this aeroplane in order to replace a broken left wheel of the undercarriage or landing gear, it will be apparent that the plane of the wings of the monoplane would initially be tilted downwardly and to the left. Usually the undersurface of the wing, or rather the framework thereof, is provided with a socket structure C for hoist engagement. As the hoist elevates the lowermost wing and with it tilts the aeroplane into horizontal position, there would be a tendency of the hoist to move out of vertical alignment. To accommodate this tendency and eliminate tilting of the hoist, which would be dangerous, there is provided a floating bearing carried by the upper end of the axial or tubular plunger 41. This floating bearing is illustrated in detail in Figs. 12, 13 and 14.

In said figures the numeral 43 indicates the top plate carried by the top end of the plunger 41. Rigidly secured thereto as by welding or the like, are two spaced angle shaped members 70 which provide undercut grooves 71 in facing relation. Members 70 are suitably secured to plate 43, as by welds 72, see Fig. 14. This forms ways to receive a cross head 73. After the same is mounted therein, the ends of the ways are closed by the stop members 74 secured to the plate 43 by the welds 75.

The cross head 73, see Fig. 13, has projecting upwardly therefrom and in central relation, a cylindrical portion 76 provided with a hemispherical head 77 for nesting in socket C, see Fig. 15. The cross head includes a recess 78, see Fig. 13. Slidably supported in the aperture 79, in one of the ways 70, is a pin 80, see Fig. 12, which has a finger engageable portion 81. Pin 80 is secured by chain 82 to the head 43, such anchorage, however, not being illustrated herein. When the pin 80 is positioned in the registering openings 78 and 79, the cross head is rigid with the plate 43 and cannot move to the left or right to positions such as shown by the dotted lines D in Fig. 13. When pin 80 is removed, the cross head 73 is free to move to the right or left as desired or required.

To facilitate such movement, an anti-friction arrangement is interposed between the cross head 73 and the plate 43. One form is conventionally illustrated herein, see Figs. 13 and 14, and includes a plurality of parallel grooves 83 in the cross head and which grooves are parallel to the ways. The walls of the grooves 83 are provided with transverse openings 84. In each of the registering set of openings 84, there is mounted a shaft or pin 85 and the same retains a roller 86 in each groove 83. To permit roller replacement, two aligned openings 87 in members 70, see Fig. 12, are provided and these are closed by the members 88. Whenever a roller breaks, it is only necessary to remove the members 88, insert a driving member in one opening 87 to remove the shaft 85, replace the desired roller, or rollers, then replace the shaft and then replace the closures 88. Of course, if a roller of the middle set requires replacement, it will be necessary to remove either adjacent roller arrangement before effecting the desired replacement.

The aforesaid mounting is an adjustable but permanent connection between the cross head and the plate 43 and with a readily renewable antifriction connection therebetween.

In Figs. 16 to 20 there is illustrated a modified form of the broad invention and one which while primarily adapted for aeroplane tail support, may, of course, be used in a similar manner for other purposes.

In said figures 110 indicates a base from which rises a tube 111 constituting the standard. Extending radially therefrom at the top is the extension or bracket 112 and diametrically opposite is the extension or bracket 113.

Chain 114—see Fig. 16—is anchored at 115, passes under sprocket 116 carried by main carriage portion 117. Bracket 112 supports sprocket 118 and the chain passes upwardly from sprocket 116 to sprocket 118 and thence downwardly to sprocket 119 carried by the projecting end of auxiliary carriage or elevator 120 passing beneath the same although in a channel 121 thereof and thence upwardly about sprocket 122 carried by the oppositely projecting end of carriage 120.

Bracket 113 supports sprocket 123 over which passes the chain 114, the same then passing downwardly to sprocket 124 mounted opposite sprocket 116 and by main carriage 117. The chain then passes upwardly into a lever operated hoist 125 having handle 126, control member 127 moving sprocket 128 and anchored as at 129 to bracket 113. The free end of the chain is indicated at 114a.

The tube 111—see Fig. 16—includes diametrical slots 130 in which is slidably mounted the auxiliary carriage or elevator 120. The tube is suitably braced as at 131. One of the braces 131, and nearest hoist 125, pivotally supports a rod 132 or the like, terminating in an elongated loop 132a. Lever 126 mounts a headed pin 133. Rigid with the base is a tube 134 in which is rotatably mounted shaft 135 projecting therefrom at each end. Shaft 135 at each end includes the angular extension 136 terminating in an outwardly directed and parallel axial portion 137 mounting a supporting wheel 138. The sleeve and base have registering apertures 139a and 139b, respectively, adapted to receive pin 140 permanently anchored to the hoist by chain 141. Shaft 135 has aperture 142 therethrough adapted to register with apertures 139a and 139b when the wheels are moved from inactive to active position. Pin 140 locks the wheels in active position wherein they project beyond or clear base 110. When tie 132 is connected to lever 126 and elevated, the lever through the tie elevates base 110 on the wheel shafts 137 as pivots and with continued upward pull, the lever serves as a draw bar for hoist transportation, in much the same manner as previously described, for the other form of the invention.

Tube 111 envelops tube 142 which at the top has an inwardly directed flange 143 that in turn slidably guides tube 144 in turn slidably guiding tubular plunger 145. Tube 142 is slotted at 146 in alignment with slots 130. Tube 144 at its lower end terminates in a bearing member 147.

Carriage 120, as stated, is slidably supported in slots 130 and 146 and tubular member 145 rests thereon. When the chain is moved to elevate, carriage 120 elevates tubular member or plunger 145 relative to tubes 111, 142 and 144 until it engages the top of slots 130. In this position, apertures 148 in tubes 145 are exposed and key or pin 150 may lock the two inner tubes together for subsequent unitary movement. The carriage hereafter in elevating, remains in elevated position.

In transverse relation to chain 114 and carriage 117 and 120 are chains 151—see Figs. 16 and 17. Tubular standard 111 is notched or slotted at 152. Tube 142 in ears 153 supports sprocket 154. Chain 151 is anchored at 155 to the outside of tube 111, passes through notch or slot 152 and over sprocket 154 and thence downwardly between tubes 142 and 144 and its opposite end is anchored at 156 in ears 157.

Tube 111—see Fig. 21—supports near its upper end a U-shaped or outboard bearing 158 that slidably supports headed pin 159. This pin carries stop member 160 which limits pin withdrawal and pin insertion movements. Tube 111 is apertured at 161, tube 142 at 162 and tube 144 at 163. All apertures are in alignment when the tubes are nested.

During elevation of plunger 145 relative to tubes 144, 142 and 111, pin 159 locks the tubes together which prevents the main carriage 117 as well as the tubes from elevating. Following the pinning of the elevated plunger (see 150), elevator 120 cannot descend. Following such pinning and removal of pin 159 from apertures 162 and 163, elevational movement of chain 114 causes elevation of elevator 117.

Since the bottom of tube 142 rests thereon, it necessarily rises therewith and now slides relative to elevated elevator 120. In this movement due to chains 151 being anchored at one end to tubular standard 111 and at the other end to the inner tube 144 (not the plunger), tube 144 elevates twice as far as the tube 142 is elevated. These two tubes are thus elevated proportionally until the desired elevation of plunger 145 is obtained.

The hoist shown holds the load as previously described. Lowering is performed by actuating member 127 which conditions the hoist for step-by-step lowering et cetera when handle 126 is actuated. Following lowering of all tubes, pin 159 is reinserted, pin 150 is removed and the plunger 145 and carriage 120 is lowered.

Reference will now be had to Fig. 16 wherein a modified form of top bearing is illustrated. Herein tubular plunger 145 supports race 170. A spindle 171 nests in the upper end of the plunger and the supercollar portion 172 bears upon the race. Projecting above the collar is tongue 173 apertured at 174. A bearing member 175, slotted at 176, nests the tongue and collar key 177, secures the spindle and bearing member together and the same are rotatably supported on the upper end of tubular plunger 145 by antifriction structure 170 for load support.

It will be observed that in this form of the invention no holding sleeves are required or utilized, that initially plunger 145 elevates half as fast as the chain moves, that plunger 145 thereafter elevates as tube 144 elevates, that tube 144 elevates twice as fast as tube 142 elevates and that tube 142 elevates a fourth as fast as the chain moves.

The two forms of the invention herein thus broadly disclosed, embody many principles and features in common.

While the invention has been described and illustrated in great detail in the foregoing description and accompanying drawings, the same is to be considered as illustrative and not restrictive in character, and the several modifications herein disclosed by way of illustration and/or description as well as others which will readily suggest themselves to persons skilled in this art, are all considered to be within the broad scope of this invention, reference being had to the appended claims.

The invention claimed is:—

1. The combination with a tubular standard and a laterally projecting base portion, braced together from top to bottom respectively, and a chain hoist structure supported by the standard eccentrically thereof, the standard being diametrically slotted at its base, of an elevator extending through the slots and including at each opposite end a plurality of superposed inwardly offset wheels, a plurality of superposed wheels in alignment with each of said wheels and at each side of the standard near the top thereof, one of the wheels last mentioned being included in the chain hoist structure and a chain operatively anchored at one end to the standard and bearing on aligned wheels of the respective sets in succession, the free run of the chain engaging the hoist wheel whereby hoist operation secures elevation of the elevator at a rate proportional to hoist wheel operation.

2. The combination with a chain hoist, a relatively stationary tubular standard to which the hoist is secured in offset relation thereto, a chain operatively anchored at one end in offset relation to the standard and movable by the hoist, an elevator associated with the tubular standard and operable by the chain, another tubular member in the standard and movable by the elevator, and a third elevatable member telescopically mounted in the prior member, of a holding sleeve having at one end a complementary portion for engagement with the stationary tube adjacent its upper end and its opposite end having a complementary portion for engaging with the upper end of the third member for holding the same elevated relative to the first member while lowering the second member.

3. A device as defined by claim 2, characterized by the addition of means other than the holding sleeve for holding the third member in elevated relation relative to the second member when the second member has been elevated and the holding sleeve has been removed.

4. The combination with a chain hoist, a relatively stationary tubular standard to which the hoist is secured in offset relation, a chain operatively anchored at one end in offset relation to the standard and movable by the hoist, an elevator associated with the tubular standard and operable by the chain, another tubular member in the standard and movable by the elevator, a third tubular member telescopically mounted in the prior member, and a fourth member telescopically mounted in the third member, of a holding sleeve having at one end a complementary portion for engagement with the stationary tube adjacent its upper end and its opposite end having a complementary portion for engaging with the upper end of the fourth member for holding same elevated relative to the first member while lowering the second and third members, and another holding sleeve having at one end a complementary portion for engagement with the stationary tube adjacent its upper end and its opposite end having a complementary portion for engaging with the upper end of the third member for holding same elevated relative to the first member while lowering the second member.

5. A device as defined by claim 4, characterized by the addition of means for holding the fourth member in elevated relation relative to the third member when the third member has been elevated and the first mentioned holding sleeve has been removed.

6. A device as defined by claim 4, characterized by the addition of means for holding the fourth member in elevated relation relative to the third member when the third member has been elevated and the first mentioned holding sleeve has been removed, and other means for holding the third member in elevated relation relative to the second member when the second member has been elevated and the second mentioned holding sleeve has been removed.

7. A device as defined by claim 2, characterized by the addition of elongated flexible means operatively anchored exteriorly of the tubular standard and to the third member, and support means for the elongated flexible means and carried by the upper end of the second member for high speed movement of the third member.

8. A device as defined by claim 4, characterized by the addition of elongated flexible means operatively anchored exteriorly of the tubular standard and to the third member, and support means for the elongated flexible means and carried by the upper end of the second member for high speed movement of the third member.

9. A device as defined by claim 4, characterized by the addition of elongated flexible means operatively anchored exteriorly of the tubular standard and to the third member, and support means for the elongated flexible means and carried by the upper end of the second member for high speed movement of the fourth member.

10. A device as defined by claim 4, characterized by the addition of elongated flexible means operatively anchored exteriorly of the tubular standard and to the third member, and support means for the elongated flexible means and carried by the upper end of the second member for high speed movement of the third and fourth members.

11. In a hoist, the combination of a relatively stationary tubular member having elongated oppositely aligned slots in the base thereof, another tubular member having registering notches in the lower end thereof and telescopically associated with the first member, an elevator extending through the slots and notches and a third member telescopically associated with the stationary member and having its lower end bearing on the elevator, the limit of elevator movement being determinable by the length of the slots.

12. A device as defined by claim 11, characterized by the second member being nestable within the first member and the third member being nestable within the second member.

13. A holding sleeve including in combination a pair of semi-tubular body portions hingedly connected at one edge, inwardly directed flange means at one end, said flange means being recessed, the recesses registering to form a central opening when the body portions are in tubular relation, the body portions including opposite elongated recesses therein opposite the flanged ends to form open end slots, and means normally constraining the body portions into tubular relation.

FREDRICK W. COFFING.